United States Patent Office 3,465,564
Patented Sept. 9, 1969

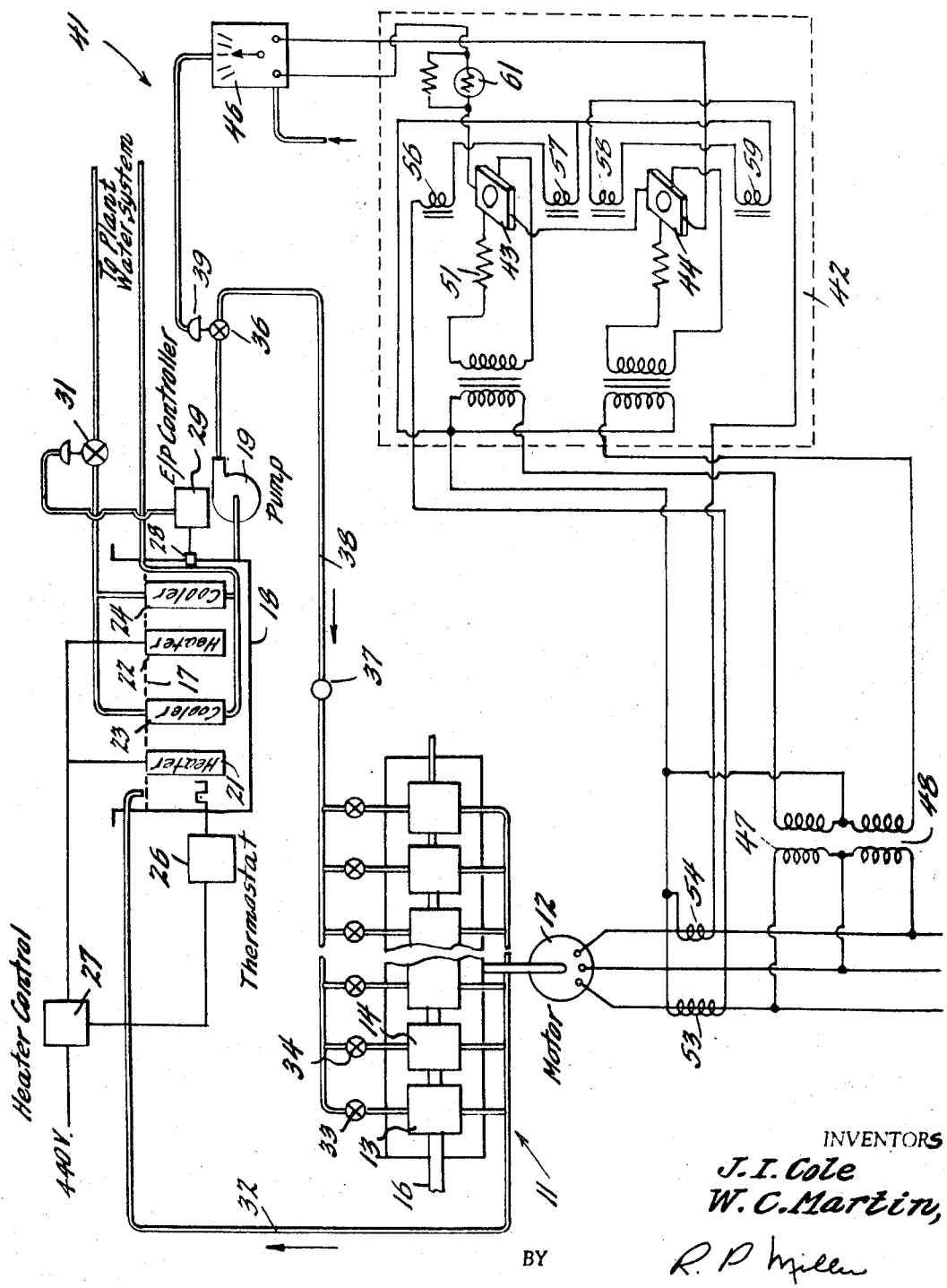

3,465,564
METHOD AND CONTROL SYSTEM FOR MEASURING AND REGULATING THE ROLLING TEMPERATURE OF A ROLLING MILL
Joseph I. Cole, Staten Island, N.Y., and William C. Martin, Naperville, Ill., assignors to Nassau Smelting and Refining Company, Inc., Tottenville, Staten Island, N.Y., a corporation of New York
Filed May 4, 1967, Ser. No. 636,196
Int. Cl. B21b 37/08, 27/06
U.S. Cl. 72—201                                    13 Claims

ABSTRACT OF THE DISCLOSURE

The temperature of a power driven rolling mill and of a material being worked by the mill are controlled through the steps of monitoring the power consumed in driving the mill to work the material at a constant value of mass per unit time and variably controlling the temperature of the mill and the material so as to eliminate any changes in the monitored power.

Background of the invention

In the rolling of metal rods, plates, and the like, it is particularly desirable that rolling take place at a substantially constant temperature selected as most favorable for producing the physical characteristics desired in the rolled product. Temperatures above that desired will tend to soften the metal and produce rod or plate of too low tensile strength. Temperatures below that desired will tend to produce rod or plate of excessive hardness.

It is known to employ thermocouples in contact with the rolling mill rolls, the metal, or a coolant being used in order to measure rolling temperatures, and then to adjust coolant flow in response to the temperature measured. It is also known to provide temperature control based upon temperature measurements using a radiation pyrometer. The contact type measuring devices, however, are subject to wear caused by contact friction. The contact measurement of coolant temperatures, in particular, can provide only an indirect and inaccurate indication of the temperature of the rolls. The radiation type measuring devices are also subject to inaccuracies, these being caused by emissivity variations due to irregularities in the surface of the metal being rolled. Therefore, a method of measuring rolling temperatures and controlling the flow of a coolant or temperature control medium to the mill rolls in response to temperature measurements, which method is accurate and reliable and yet does not involve contact-caused friction, is desirable.

Summary of the invention

An object of the invention resides in new and improved methods and apparatus for accurately measuring and controlling the operating temperature of a rolling mill.

It has been determined that the power consumed by a rolling mill during the rolling of a metal is dependent upon the mass and dimensions of the metal being rolled, the composition of the metal, the mass rolled per unit time, and the rolling temperature. If the mass, dimensions, rolling rate, and the composition of the metal are maintained constant, the only variable affecting the power consumption is the rolling temperature. A drop in rolling temperature will require increased power from the motor which drives the mill, while an increase in rolling temperature will be reflected in a decrease in the power requirement. The present invention relates to a method and apparatus for controlling rolling mill temperatures which involves adjusting the flow of a coolant or temperature regulating medium in response to changes in the power used to operate the rolling mill.

In accordance with the invention, a coolant or temperature regulating medium, the temperature of which is controlled by heat exchange apparatus in a coolant supply tank, is delivered to the mill rolls. In order to insure the rolling of material with good metallurgical and physical properties, the flow of the coolant is governed to maintain the temperature of the material being advanced to the mill rolls. This governing of the coolant flow is accomplished by measuring variations in the power consumed to drive the mill rolls and then inversely varying the coolant flow levels to insure rolled rod having the desired characteristics.

Brief description of the drawing

The single figure of drawing is a block diagram of a rolling mill and a rolling temperature measuring and controlling system that exemplifies an apparatus and a method embodying the principles of the invention.

Detailed description

Referring now to the drawing, a rolling mill 11 is driven by a motor 12, which may be of any known type, such as a three-phase, three-wire electric motor. The mill 11 is shown as having a plurality of rolling stands 13, 14, etc. for reducing the diameter of continuously cast copper rod 16 passing therethrough. While it is conventional in the art to designate the continuously cast product as "bar" prior to rolling and as "rod" after rolling, the single term "rod" is used hereinafter, for the sake of simplicity, to cover both situations. It is to be understood, that the principles of the invention relate to mills for rolling types of metals and products other than continuously cast copper rod for example, metal plates.

A coolant or temperature regulating medium 17, such as a solution of soluble oil in water, is delivered to the mill rolls and to the rod 16 from a coolant supply tank or reservoir 18 by a pump 19, in order to heat modulate or control the temperature of the rolls and the metal undergoing rolling. A pair of heaters 21 and 22, which may be immersible electric heating elements, and a pair of coolers 23 and 24, which may be heat exchange coils, are shown in the reservoir 18. The heaters and coolers are used for regulating the temperature of the coolant 17 in the reservoir. A thermostat 26 and an electric heater controller 27 regulate the heating of the coolant, while a thermocouple 28, electro-pneumatic controller 29, and a pneumatically operated flow control valve 31 regulate the cooling of the coolant 17.

The coolant or temperature regulating medium 17 is delivered by the pump 19 to the rod 16 and the rolls of each of the rolling stands 13, 14, etc. through an equal number of parallel, individually adjustable, coolant distributing valves 33, 34, etc., each associated with a different rolling stand. The distributing valves may be used to regulate the distribution of coolant among the several stands. A gravity-feed discharge line 32 is used to return the coolant to the reservoir 18 from the rolling mill 11. A control valve 36 and a conventional shut-off valve 37 are connected in a coolant feed line 38 between the pump and the mill.

In order to obtain a uniform product having a set of desired physical characteristics from the rolling mill 11, it is necessary that the rolling temperature be accurately controlled. An accurate method of measuring and controlling the rolling temperature, which avoids the use of contact type devices such as thermocouples, is employed in accordance with the principles of the invention.

It has been determined that the power used in operating a rolling mill is a function of the dimensions, mass, rolling rate, and composition of the metal being rolled and also of the rolling temperature. When the metal composition, rolling rate, dimensions, and mass are maintained constant, as in the rolling rod being continuously cast, power consumption becomes a function solely of the rolling temperature, power requirements increasing with decreased rolling temperature and decreasing with increased temperature.

A control system 41 provided in accordance with the principles of the invention, uses the power employed by the motor 12 in operating the mill 11 as an accurate measure of the rolling temperature. Power output from the three-phase, three-wire electric motor 12 is measured by a watt transducer 42.

The watt transducer 42 operates in conventional manner based upon the "Hall effect," i.e., the principle that when a conductor carries a current at right angles to a magnetic field, a charge differential is generated mutually perpendicular to both the magnetic field and the current. The charge differential is of a magnitude proportional to the current, the magnetic flux, and the phase angle therebetween. By connecting motor line voltage across one or more calibrating resistors, to provide a current input, and connecting line current to plural electromagnet coils, to produce a magnetic flux input, the charge differential is made proportional to the power output of the motor to serve as a measure thereof. Further information concerning the use of the Hall effect for measuring power may be found in "Westinghouse Description Bulletin 43–840," dated December 1962 and "Westinghouse Application Data 43–840," dated May 1963, both of which may be obtained from the Westinghouse Electric Corporation, Relay Instrument Division, Newark Plant, Newark, N.J.

Two Hall crystals 43 and 44, which constitute the principal elements of the watt transducer 42, are shown in the figure connected in series across a mill power indicating and pneumatic pressure regulating unit 46. These crystals are composed of any known semiconductor material which is of sufficiently low resistance to permit a usable amount of power to be drawn and which is relatively insensitive to temperature variations. A pair of potential responsive transformers 47 and 48 are connected to the motor lines and provide current to the crystals 43 and 44 through calibrating resistors 51 and 52, respectively. The current flow through the crystals is perpendicular to the series connection therebetween which couples the crystals across the power indicating unit 46. A pair of current pickup coils 53 and 54 are operated by current flow through the motor lines and provide a magnetic flux perpendicular to the planes of the Hall crystals 43 and 44, respectively, through coils 56 and 57 and coils 58 and 59. Thus, an output voltage signal, proportional to the power used by the motor 12, is impressed across the terminals of the indicating unit 46, which functions as a voltmeter. Since voltage signal is a function of the rolling temperature, the indicating unit 46 may be calibrated either in units of motor power or of mill rolling temperature. A thermistor 61 may be used to stabilize the temperature-resistance characteristics of the watt transducer 42.

The indicating unit 46 also functions in conventional manner in response to the input voltage signal as an electro-pneumatic controller for metering pressurized air to a pneumatic servomotor 39. The unit 46 controls the flow of air to the servomotor from a source of pressurized air. The motor 39 selectively positions the control valve 36 in order to regulate the flow of coolant to the rod 16 and the several rolls of the rolling mill 11. Thus, a controlled application of air to the control valve motor 39, responsive to rolling temperatures measured by the watt transducer 42, regulates the position of the control valve 36, adjusting the flow of coolant to maintain the rolling temperature substantially constant or to heat modulate the rod 16 and the rolls of the rolling mill.

Briefly reviewing now, the method involves controlling the temperature of the copper rod to assure good metallurgical characteristics in the resultant rolled rod through the operation of the above-described temperature measuring and controlling system. The first step requires the operator to initially set the electric heater controller 27 and the electro-pneumatic controller 29 to maintain the coolant 17 in the reservoir 18 at a desired temperature (e.g., 160°–165° F.). The operator also sets the coolant distributing valves 33, 34, etc. to maintain a desired distribution of coolant among the rolling stands 13, 14, etc. for regulating temperatures among the individual stands.

Next, the rod is advanced into the mill and, during rolling of the rod 16, any change in rolling temperature is reflected in a change in the power required to operate the mill 11. This, in turn, is measured by the watt transducer 42 to reposition the control valve 36. The control valve 36 is repositioned through operation of the unit 46 to vary the flow of pressurized air to the servomotor 39 for actuating the control valve. The new position of the control valve 36 alters the flow of coolant or temperature regulating medium to the rod 16 and the rolls of the rolling mill 11 so as to return the rolling temperature to a desired level or to heat modulate the rolling mill. With the practice of the method, as exemplified by operation of the illustrated control system, the rolling temperature is maintained substantially at the desired level.

It is to be understood that the above-described methods and apparatus are simply illustrative of the method and apparatus of the invention. It is also to be understood that, while the invention contemplates normally heat modulating by cooling, heat modulation by heating may be appropriate in certain situations, e.g., in cold rolling. Also, apparatus and procedures, other than the illustrated automatic system, may be used in practice of the method. For example, other power measuring devices may be utilized, such as a wattmeter. An operator may manually control the position of a control valve to vary the flow of a coolant to the mill inversely in accordance with observed power readings on a meter, such as the meter 46. Other flow control systems and other systems for flowing temperature regulating medium to the mill, e.g., to cool the mill rolls internally, may be used in place of the exemplary systems described above. Many other modifications may be made without departing from the invention.

What is claimed is:

1. In a method of controlling the temperature of a power driven machine working on a material at a constant value of mass per unit time and of controlling the temperature of the material being worked:

monitoring the power consumed in driving the machine to work the material, and variably controlling the temperature of the machine and of the material in a direction of variation toward eliminating changes in the monitored power.

2. A method of regulating the temperature of a rolling mill driven at constant speed by a motor and the temperature of a material being worked by the mill, which comprises the steps of:

applying a temperature regulating medium to the rolling mill in a location selected to cool the mill rolls and the material, while monitoring the power used by the motor in driving the mill at constant speed to work the material, and varying the rate of application of temperature regulating medium in accordance with changes in the monitored power in a direction of variation toward eliminating the changes.

3. A method of controlling the temperature of a work material being advanced through a rolling mill driven by a motor, which comprises the steps of:

flowing a cooling medium into the rolling mill and into a position selected to cool the mill rolls and the work material, measuring the power used by the motor in driving the mill and advancing said material, and inversely varying the flow of cooling medium supplied to the mill in response to changes in the power measured.

4. A method of measuring the temperature of a metal undergoing rolling in a mill driven by a motor, which comprises the steps of:

controlling the composition, rolling rate, mass, and dimensions of the metal undergoing rolling to maintain constant values thereof, while generating a signal proportional to power consumed by the motor in driving the mill to roll the metal, and displaying said signal on an indicator device, while exhibiting the displayed signal calibrated in units of temperature.

5. In a system for regulating the operating temperature of a power driven machine working on a material at a constant value of mass per unit time and the temperature of the material being worked, means for variably controlling the temperature of the material and the machine, means for monitoring the power consumed in driving the machine to work the material, and means operable on said temperature control means in response to monitored changes in power consumed by said machine for varying the temperature of the material and the machine in a direction of variation toward reducing the monitored changes in power.

6. In a rolling mill driven by a constant speed motor to perform work on a material, means for applying a temperature regulating medium to the rolling mill into a position selected to cool the mill rolls and the material, means for monitoring the power used by the constant speed motor in driving the mill to perform the work on the material, and means responsive to monitored changes in the power used by the motor in driving the rolling mill for varying the rate of application of temperature regulating medium by said applying means in a direction of variation toward reducing said monitored changes.

7. In a rolling mill driven by a motor to work a material, a temperature control system which comprises:

a source of a temperature regulating medium, means for supplying the temperature regulating medium from said source to a location within the rolling mill selected to cool the mill rolls and the material, detecting means for measuring the power used by the motor in driving the rolling mill to work the material, and flow regulating means responsive to the power measured by said detecting means for controlling the flow of temperature regulating medium supplied into the rolling mill by said supplying means.

8. In a rolling mill as set forth in claim 7:

means spaced from the rolling mill for cooling the temperature regulating medium, means spaced from the rolling mill for heating the temperature regulating medium, and thermostat means for regulating the operation of the cooling means and the heating means to maintain constant the temperature of the temperature regulating medium being supplied to cool the rolls and material.

9. In a system for regulating the temperature of a fluid medium applied to control the temperature of material being worked by a machine driven by a power source, a reservoir for holding a supply of said fluid medium, means connected to said reservoir for applying stream of said fluid medium to said material being worked on by said machine, means for varying the flow of said fluid medium to said material, and means responsive to changes in output power from said source for operating said varying means to increase the flow of said fluid medium in response to decreases in output power and to decrease the flow of said fluid medium in response to increases in output power.

10. In an apparatus for rolling rod stock, a rolling mill for advancing and working on said rod stock, a recirculatory fluid system for flowing a coolant over the rolls of said rolling mill and said advancing stock, means for varying the rate of flow of said coolant through said recirculatory system, a motor connected to an electrical power source for driving said rolling mill, means responsive to the electrical power consumed for generating a control signal varying in magnitude in accordance with variations in the consumed power, and means responsive to variations in said control signal for operating said varying means to vary the flow of said coolant in inverse proportion to changes in magnitude of said control signal.

11. A method of maintaining constant the temperature of a material being worked upon at a constant value of mass per unit time by a power driven rolling mill, which comprises:

detecting variations in the power consumed by the rolling mill in working on the material; and controlling the cooling of the material in response to detected power variations so as to eliminate said detected power variations.

12. A method of controlling the temperature of a material advancing at a constant value of mass per unit time through a power driven rolling mill, which comprises:

continually regulating the temperature of the mill rolls and of the material being rolled; while measuring the power consumed in driving the mill and advancing the material; and varying the regulation of temperature in accordance with variations in the measured power in a direction toward maintaining the consumed power constant.

13. A method of rolling a material so as to impart substantially uniform physical properties thereto, which comprises the steps of:

working the material in a motor driven rolling mill at a constant value of mass per unit time, while monitoring the power consumed by the motor in driving the rolling mill, applying a relatively large volume of coolant to the vicinity of the material during periods of relatively low values of monitored power, and applying a relatively small volume of coolant to the vicinity of the material during periods of relatively high values of monitored power.

References Cited

UNITED STATES PATENTS

| 1,040,862 | 10/1912 | Blaxter | 72—19 |
| 1,059,821 | 4/1913 | Blaxter | 72—19 |
| 1,059,955 | 4/1913 | Blaxter | 72—19 |
| 2,431,473 | 11/1947 | Flynn | 165—14 |
| 2,957,349 | 10/1960 | Holowaty et al. | 73—351 |
| 3,134,279 | 5/1964 | Sims et al. | 72—19 |
| 3,364,977 | 1/1968 | Machida | 164—154 |

CHARLES W. LANHAM, Primary Examiner

E. M. COMBS, Assistant Examiner